United States Patent [19]

Hayes

[11] Patent Number: 4,680,114

[45] Date of Patent: Jul. 14, 1987

[54] WATER PURIFICATION APPARATUS

[75] Inventor: John Hayes, Berkshire, United Kingdom

[73] Assignee: Tarn-Pure Limited, Buckinghamshire, England

[21] Appl. No.: 700,880

[22] PCT Filed: Jun. 14, 1984

[86] PCT No.: PCT/GB84/00206

§ 371 Date: Feb. 8, 1985

§ 102(e) Date: Feb. 8, 1985

[87] PCT Pub. No.: WO85/00034

PCT Pub. Date: Jan. 3, 1985

[30] Foreign Application Priority Data

Jun. 14, 1983 [GB] United Kingdom ............... 8316213

[51] Int. Cl.⁴ .............................................. C02F 1/46
[52] U.S. Cl. .................................... 210/192; 210/243; 204/228; 204/293
[58] Field of Search ............... 210/748, 243, 764, 169, 210/192; 204/149, 228, 233, 293

[56] References Cited

U.S. PATENT DOCUMENTS 3,528,905  9/1970  Miller .................................. 204/272
3,654,119  4/1972  White et al. ........................ 204/228

FOREIGN PATENT DOCUMENTS 674148   3/1939  Fed. Rep. of Germany .
868314  12/1941  France .
2067724  8/1971  France .

Primary Examiner—Tom Wyse
Attorney, Agent, or Firm—Watson, Cole, Grindle & Watson

[57] ABSTRACT

Apparatus which is adapted to purify water by the introduction of metal ions into the water. A chamber (16) is provided which houses two electrodes (E1 & E2) which are made of metals whose ions are known to have water-purification properties. Water to be purified is passed through the chamber, whereupon a controlled concentration of purifying ions are passed into the water. The metal ions preferably include silver and/or copper to control respectively bacteria and algae. Furthermore, in order to minimize adverse electrolytic effects it has been found advantageous to reverse the polarity of the potential difference across the electrodes at regular intervals.

7 Claims, 2 Drawing Figures

WATER PURIFICATION APPARATUS

BACKGROUND OF THE INVENTION

1. Field of the Invention

The present invention relates to water purification apparatus which is particularly, but not exclusively, applicable to purification of water in swimming pools.

2. The Prior Art

It is known that certain metal ions have purifying properties when present in water. It has been established that silver ions are extremely effective at controlling the growth of bacteria populations, and similarly that copper ions act as an efficient algicide.

There have been various proposals to provide apparatus adapted to purify water by the introduction of metal ions into water. However, it is not believed that any of the proposals have resulted in comercially acceptable apparatus. Referring to e.g., U.S. Pat. No. 3,092,566; British Pat. No. 1,331,308; British Pat. No. 950,482 and British Pat. No. 950,481 it is noticeable that while the constructions are described in detail, operating parameters are not generally given. It is believed that the operating parameters of the apparatus are of paramount importance for the following reasons.

The efficiency of silver and copper ions for purification is well documented and has been known since Roman times. However, it is believed that the very efficiency of these ions for purification purposes has led previous constructors of apparatus to use levels of concentration of the ions in water which are too low, which in turn has led them to use very low currents for the release of the ions.

It is believed that this rendered previous apparatus susceptible to variations in the conductivity of the water to be purified with consequent deleterious results.

It is an object of the present invention to provide apparatus adapted to reliably purify water by introduction of metal ions into the water using an electrolytic process.

SUMMARY OF THE INVENTION

The present invention provides water purification apparatus comprising a chamber for receiving water to be purified, two electrodes in the chamber which are arranged to be connected to a power supply, the electrodes containing a metal whose ions have purifying properties when present in water, and circuitry for maintaining a stable current between the electrodes.

The metal ions preferably include silver and/or copper to control respectively bacteria and algae, whereupon the apparatus is provided with electrodes of a suitable silver/copper alloy.

It is particularly advantageous to reverse the polarity of the potential difference across the electrodes at regular intervals, so as to minimise certain adverse electrolytic effects, such as selective deposition on one electrode, premature exhaustion of the anode (by virtue of passage of metal ions into solution) and similar asymmetric effects, which would lead to the need to replace electrodes more frequently.

Features and advantages of the present invention will become apparent from the following description of an embodiment thereof, given by way of example, when taken in conjunction with the accompanying drawings.

DESCRIPTION OF THE PREFERRED EMBODIMENT

The embodiment to be described is particularly suitable for purification of water in swimming pools, but the invention can equally well be applied (with or without further modification where appropriate) to other installations where standing water is to be kept pure.

Figure 1:
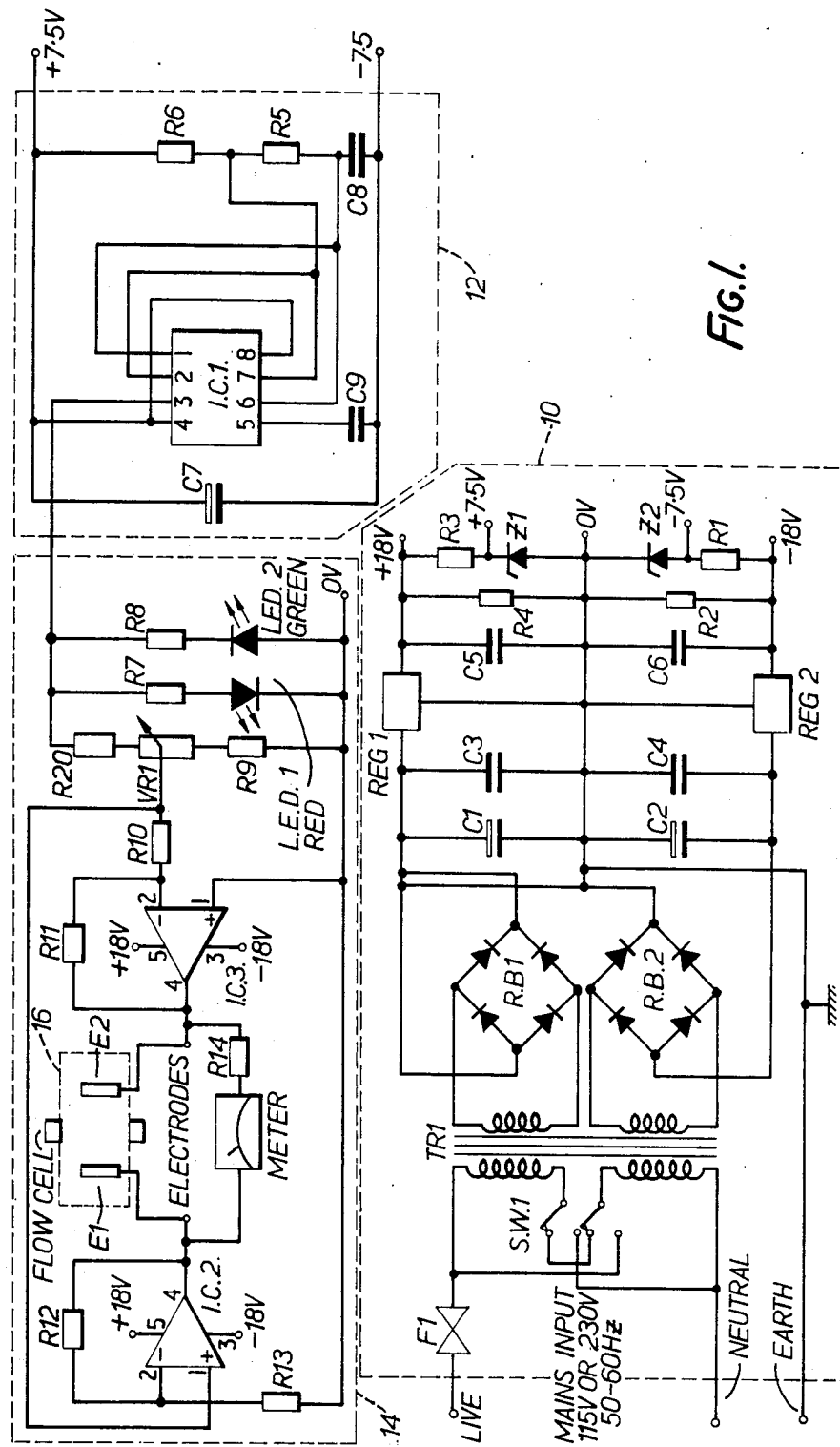
FIG. 1 shows a circuit diagram of control apparatus for use in an electrolytic water purifier aaccording to the invention.

Referring to FIG. 1 of the drawings, the circuit includes a power supply 10, a periodic voltage inverter 12 and a voltage regulator and amplifier 14.

The power supply 10 is broadly conventional in form, including a transformer TR1 switchable for different input mains voltages, two bridge rectifiers RB1, RB2 providing positive and negative voltages referred to earth or ground potential. Capacitors C1-C6, voltage regulators REG1, REG2 and resistors R2, R4 provide voltages of +18 v and −18 v; resisters R1, R3 and zener diodes Z1, Z2 provide further voltages of +7.5 v and −7.5 v.

The latter (lower) voltages are fed to the periodic voltage inverter 12 which is based around a timer integrated circuit IC1, such as a 555 timer. The interconnection of the timer integrated circuit IC1 with resistors R5, R6 and capacitors C7-C9 as shown results in an output signal appearing on pin 3 which periodically reverses between positive and negative voltages, the interval between reversals being determined by the time constant of the resistive and capacitive timing components.

The output signal from the voltage inverter 12 is fed to the voltage regulator and amplifier 14 across a resistive chain consisting of resistor R20, variable potentiometer VR1 and resistor R9. The slider of potentiometer VR1 therefore provides a periodically reversing voltage whose value is variable and depends on the setting of the slider; the resistors R9 and R20 limit the extremes of voltage available. Connected across the resistive chain are resistor R7 and LED 1 connected in series, and resistor R8 and LED 2 connected in series. The LEDs are connected with opposite polarities are conveniently different colours so as to indicate the polarity of the periodically reversible voltage at any instant.

The voltage from the slider of potentiometer BR1 is fed to the non-inverting input of a low impedance operational amplifier IC2 and also, via a resistor R10, to the inverting input of a low impedance operational amplifier IC2. Amplifier IC2 is connected as shown to resisters R12, R13 and amplifier IC3 to resistor R11; both amplifiers receive ±18 v from the power supply 10 and act to amplify the voltage signal from potentiometer VR1 to provide respective output signals of higher voltage but of mutually-opposed polarity. The output is at 34 to 36 volts and results in an output current of between 100 to 500 milliamps with a peak of 900 milliamps. These opposite polarity signals are fed to electrodes E1, E2 of a flow cell 16, which advantageously has a meter and resistor R14 connected across the electrodes in order to monitor the potential difference across the electrodes. The electrodes E1, E2 are made of the metal whose ion is required in solution, or an alloy if more than one ion is required. In the preferred application of swimming pool water purification, the composition of the electrodes is a copper-silver alloy, preferably 97% copper and 3% silver.

In some applications such as spas and other applications where algae is at a lower level but bacteria may be higher, due to excessive bathing loads, for instance, or in industrial applications where the amount of light is limited, the ratio of silver to copper in the alloy is increased. For example, an electrode composition of 20% silver and 80% copper may be suitable.

Figure 2:
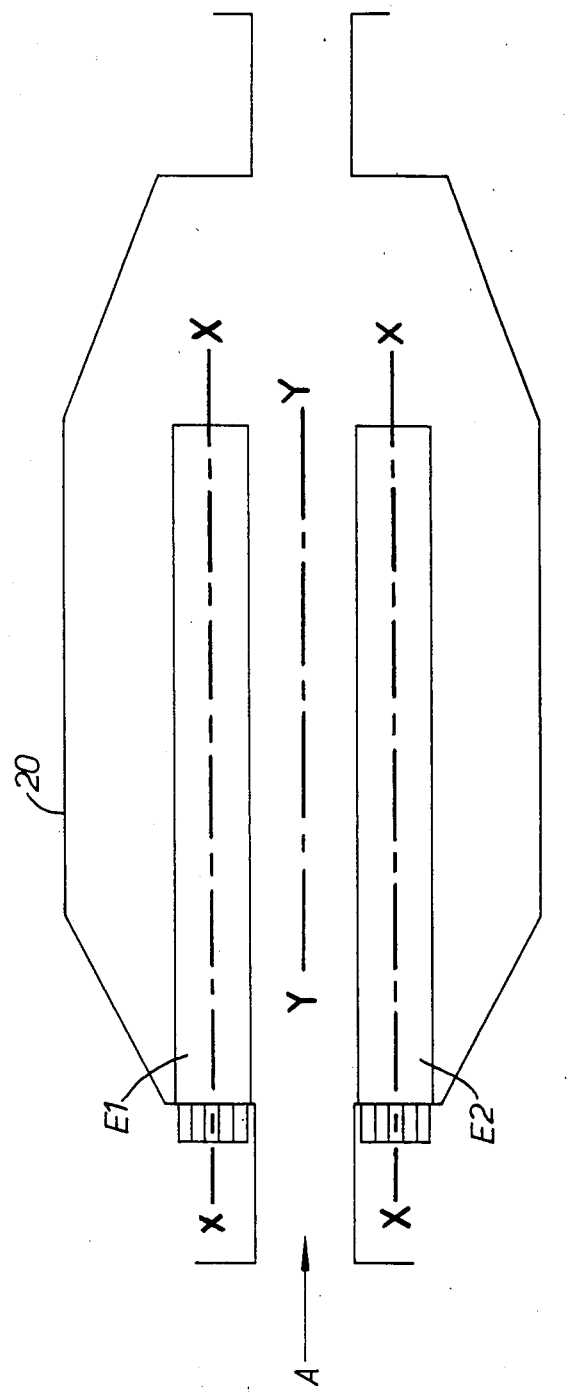
FIG. 2 shows a typical chamber/electrode lay out.

The flow cell 16 shown in more detail in FIG. 2 is installed in the water circulation system of a swimming pool, upstream of the filter and preferably between the pump and the filter. Electrical power for the unit if advantageously taken from the circuit to the pump, thus providing operation of the unit only when water is circulating; this avoids wasteful operation when not required, and consequent saving of electrode material. It has been found in practice that silver ion concentrations of about 0.05 mg/liter and copper ion concentrations of between 0.5 and 10 mg/liter are optium for efficient purification, and the preferred electrode alloy composition of 97% copper and 3% silver provides such concentrations.

The flow cell comprises a housing 20 forming a chamber within which the electrodes E1 and E2 are provided. Each electrode uses a square cross section of nominally 1" side and the electrodes are on 3" centres. The electrodes, which are shaped like rods, have axes X which are parallel to one another and to a straight line Y which extends through the inlet and outlet of the housing. The shape of the housing 20 is such that water flowing in the direction of arrow A is swirled inside the housing to promote more even electrode wear and cause any gases produced to be swept away.

In operation, the periodic voltage inverter 12 provides the output signal to the regulator and amplifier 14, the appropriate LED 1 or 2 lighting dependent on the polarity of the signal. The potentiometer VR1 is set to provide a desired potential difference (up to about 34v) between electrodes E1 and E2, monitored by the meter. The meter also indicates the polarity reversals. The potential difference between electrodes E1 and E2 controls the electrolytic rate of the flow cell 16, i.e., the rate at which ions enter into solution.

Copper and silver ions are thus passed into solution, where a proportion floculate and are caught by the filter media, removing and killing bacteria and algae and other micro-organisms. Although the size of individual bacteria may vary from 1–3 microns and the filter effect of sand from 10–20 microns dependent on the filter's maturity, the effect of bacteria and algae absorbing electrically charged ions of copper and silver produces an electrostatic reaction, resulting in charged bacteria and algae clinging together to produce a large filterable mass which is held in the filter media. Any organisms surviving this process are killed or prevent from proliferating until the next cycle through the unit by passage into water of charged copper and silver ions.

Furthermore, the water in the pool or reservoir is maintained at the correct ion level by continuous recycling, and regularly monitoring of the ion content by poolside testing.

This process thus provides a constant, regulated and stable source of water sterilisation, in comparison to the conventional methods of dosage by chemicals (such as chlorine) which are haphazard in nature and subject to loss to the atmosphere by reaction with sunlight. The electrolytic process does not suffer from such losses, and any variation in ion level from other causes is quickly regulated by further passage of ions into solution.

It is also possible to add apparatus for applying a large magnetic field to the water either at the input to or output from the flow cell in order to prevent build up to Calcium in the system. Such apparatus is commercially available and will not be described in detail therefore.

I claim:

1. Water purification apparatus comprising a chamber having an inlet for receiving water to be purified and an outlet for discharging purified water, said inlet and said outlet being aligned such that an imaginary straight line passes therethrough; two parallel rod electrodes mounted in the chamber so as to be disposed with their axes aligned in parallel with said imaginary straight line and spaced apart on either side of said straight line whereby there is formed an unimpeded flow path between the two electodes for flow of water between the inlet and the outlet, said electrodes containing a metal whose ions have purifying properties when present in the water; and circuitry connected to said electrodes for maintaining a stable current between said electrodes.

2. Water purification apparatus, according to claim 1, wherein the electrodes contain copper and the current is such as to cause a concentration of copper in water of 500 to 800 parts/billion.

3. Water purification apparatus according to claim 1, wherein the electrodes contain silver and the current is such as to cause a concentration of silver in water of about 10 parts/billion.

4. Water purification apparatus according to claim 1, wherein the electrodes are each an alloy of copper and silver in the proportions 97% copper and 3% silver.

5. Water purification apparatus according to claim 1, wherein the circuitry includes low impedence output DC amplifiers whereby the current is not influenced by changes in conductivity of the water.

6. Water purification apparatus according to claim 1, wherein the circuitry supplies current at 34 to 36 volts.

7. Water purification apparatus according to claim 1, wherein the chamber is shaped to cause turbulence of the water in the chamber to promote even use of the electrodes.

* * * * *